United States Patent
Zhang et al.

(10) Patent No.: US 9,077,484 B2
(45) Date of Patent: Jul. 7, 2015

(54) GENERATION OF POLARIZATION-ALTERNATED QPSK FORMAT

(71) Applicant: NEC Laboratories America, Inc., Princeton, NJ (US)

(72) Inventors: Shaoliang Zhang, Plainsboro, NJ (US); Fatih Yaman, Monmouth Junction, NJ (US); Ting Wang, West Windsor, NJ (US); Yoshihisa Inada, Tokyo (JP); Takaaki Ogata, Tokyo (JP); Yasuhiro Aoki, Tokyo (JP)

(73) Assignees: NEC Laboratories America, Inc., Princeton, NJ (US); NEC Corporation (JP)

(*) Notice: Subject to any disclaimer, the term of this patent is extended or adjusted under 35 U.S.C. 154(b) by 24 days.

(21) Appl. No.: 14/046,588

(22) Filed: Oct. 4, 2013

(65) Prior Publication Data

US 2014/0178071 A1 Jun. 26, 2014

Related U.S. Application Data

(60) Provisional application No. 61/709,518, filed on Oct. 4, 2012.

(51) Int. Cl.
H04B 10/04 (2006.01)
H04J 14/06 (2006.01)
H04B 10/556 (2013.01)

(52) U.S. Cl.
CPC ............ *H04J 14/06* (2013.01); *H04B 10/5561* (2013.01)

(58) Field of Classification Search
CPC ............. H04B 10/532; H04B 10/5561; H04B 10/504; H04B 10/505; H04B 10/5053; H04B 10/5055; H04B 10/516; H04B 10/5161; H04B 10/556; H04J 14/06; H04J 14/0298
USPC .................. 398/184, 185, 183, 182, 198, 152
See application file for complete search history.

(56) References Cited

U.S. PATENT DOCUMENTS

| | | | | |
|---|---|---|---|---|
| 8,571,416 B2* | 10/2013 | Grobe | ........................... | 398/184 |
| 8,660,425 B2* | 2/2014 | Aoki | ............................... | 398/25 |
| 8,768,181 B2* | 7/2014 | Onohara et al. | ............. | 398/211 |
| 8,849,125 B2* | 9/2014 | Sun et al. | ...................... | 398/140 |
| 8,867,926 B2* | 10/2014 | Xie et al. | ...................... | 398/184 |

* cited by examiner

Primary Examiner — M. R. Sedighian
(74) Attorney, Agent, or Firm — Joseph Kolodka

(57) ABSTRACT

Methods, structures and systems for generating different polarization multiplexed signals wherein the drivers of the modulators are generic while a software-controlled manager allows the carrying of any standard 10 G/40 G/100 G data while—at the same time—being adaptively adjustable according to specific link requirements and users' requests in both dispersion-managed and uncompensated links.

7 Claims, 3 Drawing Sheets

(a) Bit Encoding for PolMux BPSK (b) Bit Encoding for PolMux QPSK (c) Bit Encoding for PolSw QPSK (d) Bit Encoding for PolAl QPSK

GENERATION OF POLARIZATION-ALTERNATED QPSK FORMAT

CROSS REFERENCE TO RELATED APPLICATIONS

This application claims the benefit of U.S. Provisional Patent Application Ser. No. 61/709,518 filed Oct. 4, 2012 which is incorporated by reference in its entirety as if set forth at length herein.

TECHNICAL FIELD

This disclosure relates generally to the field of optical communications and in particular to methods, apparatus and structures pertaining to the generation of polarization-alternated QPSK signaling format.

BACKGROUND

Contemporary optical communications systems make extensive use of single mode optical fiber whose capacity limits are rapidly approaching. Consequently, methods, apparatus and structures that prolong the growth in capacity of such systems would represent a welcome addition to the art.

SUMMARY

An advance in the art is made according to an aspect of the present disclosure directed to methods, structures and systems employing a superchannel and adaptive forward error correction (FEC) along with polarization manipulation techniques to provide 10 G/40 G/100 G data transmission over any transmission link. As such, methods, structures and systems according to the present disclosure adjust to polarization multiplexing scheme(s) of DP-QPSK transmitter signals such that different sensitivities and increased transmission distances are achieved.

Viewed from a first aspect, a DP-QPSK transmitter achieves different transmission distances by employing polarization multiplexing schemes that are first adjusted through the effect of a novel binary bit encoder. The binary bit encoder enables the DP-QPSK transmitter to produce Pol-Mux, PolSw, Polarization-alternated (PolAl) QPSK and Pol-Mux BPSK signals advantageously resulting in enhanced receiver sensitivity and transmission reach. Complementing this arrangement is a multi-tone generation and adaptive FEC such that 10 G/40 G/100 G data is carried.

Viewed from another aspect, a DP-QPSK transmitter comprises a client interface framing module for receiving an input data signal; a binary bit encoder module operable to generate different polarization multiplexed signals; an adaptive FEC encoder module; a multi-tone generation & DeMux module including an RF clock, a Multi-tone generator and a programmable wavelength selective switch; a number of modulators for modulating the FEC encoded signals onto the number of subcarriers produced by the multi-tone generation and demux modulator module; a combiner for combining the modulated signals into an output signal; and a control manager module operable to determine and set bit encoding parameters, the number of subcarriers produced by the multi-tone generation & demux module and FEC coding rate such that the output signal is one selected from standard 10 G, 40 G, and 100 G data.

BRIEF DESCRIPTION OF THE DRAWING

A more complete understanding of the present disclosure may be realized by reference to the accompanying drawings in which:

FIG. 2($b$) shows a schematic view of a bit encoding for PolMux QPSK according to an aspect of the present disclosure;

FIG. 2($c$) shows a schematic view of a bit encoding for PolSw QPSK according to an aspect of the present disclosure;

FIG. 2($d$) shows a schematic view of a exemplary implementation of multi-tone generation and demultiplexing according to an aspect of the present disclosure.

DETAILED DESCRIPTION

Figure 1:
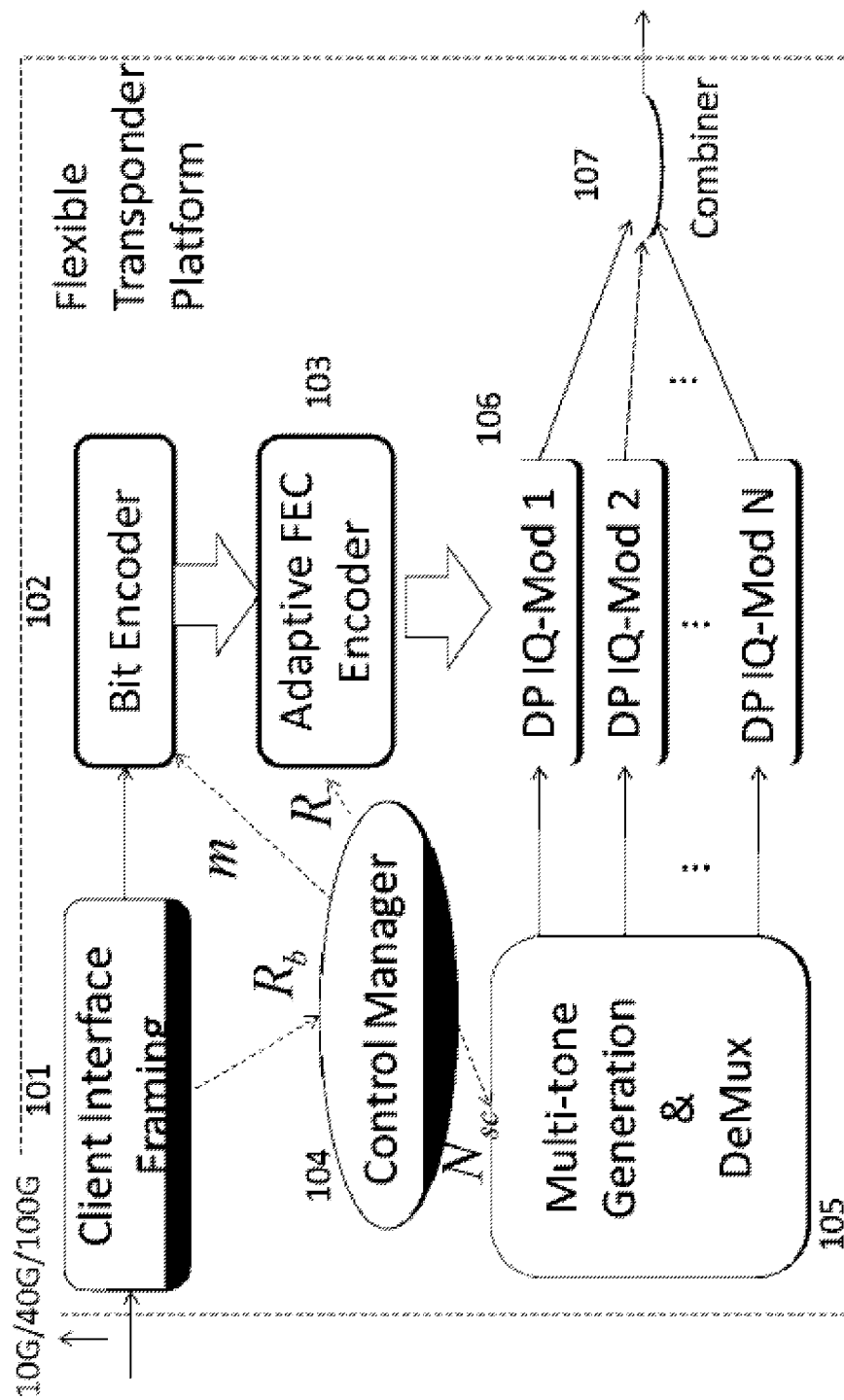
FIG. 1 shows a schematic view of an optical architecture exhibiting a flexible-bit-rate DP-QPSK transponder with a software controlled manager according to an aspect of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known circuits, structures and techniques have not be shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

By way of some additional background, it is noted that as the use of coherent detection in optical communications systems has become commonplace, the bit rate per channel has dramatically increased from 10 Gb/s to 100 Gb/s, 400 Gb/s up to 1 Tb/s due—in part—to the increasing volume of Internet traffic including video sharing and high-definition television.

Further advancing the increase in bit rates has been advanced modulation formats such as Quadrature Phase-Shift Keying (QPSK) and Quadrature Amplitude Modulation (QAM). As is known, dual polarization (DP) QPSK transponders providing 100 Gb/s data over optical networks are now commonplace. Similarly, due in part to its high receiver sensitivity and tolerance to fiber non-linearities, polarization-multiplexed (PolMux) QPSK is employed for ultra-long-haul undersea optical transmission.

Despite such significant improvements, much research effort has been made to increase the spectral efficiency (SE) of undersea optical fiber communication systems through the effects of advanced 8 QAM and 16 QAM signaling formats as employed in 100 G transmission systems over transoceanic distances. Such efforts have included large overhead soft-decision (SD) low-density parity check codes (LDPC), non-linear compensation techniques and maximum a posterior (MAP) detection.

Notwithstanding such development, when upgrading legacy, dispersion-managed fiber (DMF) transmission links to 100 Gb/s or higher, the 100 G PolMux QPSK format is unsuitable for such upgrade due—in part—to the nonlinearity of the link. One alternative is to replace the 100 G PolMux QPSK with dual-peak 50 G PolMux binary phase shift keying (BPSK), which exhibits a tolerance to the nonlinearities and higher receiver sensitivities at a same baud rate. Moreover, recent demonstrations of polarization-switched (PolSw) QPSK surpasses the performance of PolMux BPSK at the same bit rate due to its more dense packing of PolSw QPSK constellation over 4-dimensional signal space. Unfortunately, each of these different modulation formats requires a specific transmitter architecture thus increasing the time and cost of any upgrade.

As is known, to generate different polarization schemes, different architectures have been proposed and developed including polarization modulator (See, e.g., L. E. Nelson et al, "Experimental Comparison of Coherent Polarization-switched QPSK to Polarization-Multiplexed QPSK for 10×10 km WDM Transmission", Opt. Express, vol. 19, no. 11, pp 10849-10856, 2011); two parallel intensity modulators (See, e.g, M. Sjodin et al., "Comparison of Polarization Switched QPSK and Polarization-Multiplexed QPSK at 30 Gbit/s", Opt. Express, 19, 7839-7846, 2011); and an XOR operation (See., e.g, J. Renaudier, et.al., "Experimental Comparison of 28 Gbaud Polarization-Switched and Polarization Division Multiplexed QPSK in WDM long haul transmission system", Proc. ECOC, 2011, paper Mo.2.B.3; have been proposed to generate PolSw QPSK signals. As may be appreciated, to generate PolMux QPSK signals, it is necessary to remove components while adjusting to data rate needs.

A number of modularots has been used for generating multi-level differential binary phase-shift keyed (DPSK) with binary signaling (See, e.g., M. Eiselt, et.al., "Programmable Modulation for High Capacity Networks", in Proc., ECOC, 2011, paper Tu.5A5.

Finally an optical platform incorporating multi-tone generators and multiple IQ-modulators has been shown to generate different modulation formats and different number of superchannels to provide multi-flow transponders exhibiting a flexible bit rate (See, e.g., H. Takara et.al., "Experimental demonstration of 400 Gb/s multi-flow, multi-rate, multireach optical transmitter for efficient elastic spectral routing", in Proc. ECOC, 2011, paper Tu.5.A.4).

Such schemes, however, cannot adjust the polarization of the signals and still require multi-level electrical signals to drive IQ-modulators, thereby exhibiting limited transmission distance and costly linear drivers.

With simultaneous reference now to FIG. 1 and FIGS. 2(a)-2(d), there it may observed a schematic of an architecture exhibiting flexible-bit-rate DP-QPSK transponder with a software controlled manager (FIG. 1) and operational modes (FIGS. 2(a)-2(d)) according to an aspect of the present disclosure. As depicted in FIG. 1 the "Flexible Transponder Platform" according to the present disclosure includes a Client Interface Framing Module (101), a Bit Encoder Module (102), an Adaptive FEC Encoder Module (103), a Control Manager Module (104), a Multi-ton Generation & DeMux Module (105), a number (N) of DP IQ-Modulators (106) and a combiner module (107).

Depending upon the transmission link and required system margin, the (binary) Bit Encoder Module (102) is adjusted such that different polarization multiplexed signals may be produced namely, PolMux, PolSw, PolAl-QPSK, and PolMux BPSK. Accordingly, the binary Bit Encoder Module (102) has four operational modes—as depicted in FIGS. 2(a)-2(d) namely: 2(a) Bit Encoding for PolMux BPSK; 2(b) Bit Encoding for PolMux QPSK; 2(c) Bit Encoding for PolSw QPSK; and 2(d) Bit Encoding for PolAl QPSK.

Figure 2A:
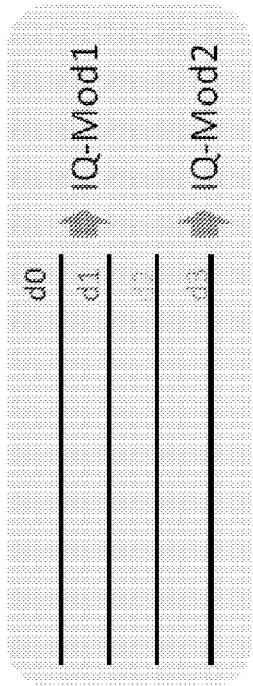
FIG. 2($a$) shows a schematic view of a bit encoding for PolMux BPSK according to an aspect of the present disclosure.
Figure 2B:
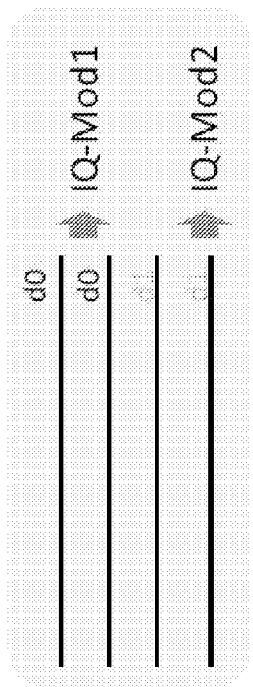
Figure 2C:
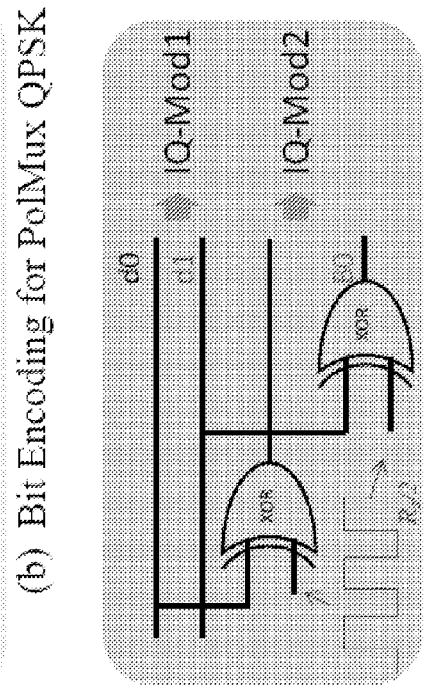
Figure 2D:
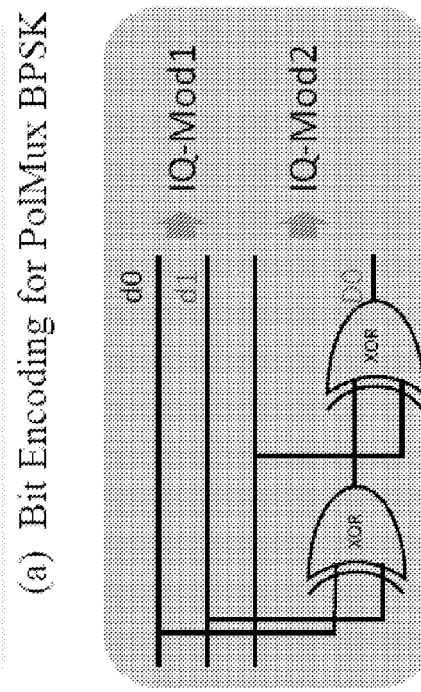

As may be observed from FIGS. 2(a)-2(d), for PolMux BPSK (depicted in FIG. 2(a)), inphase and quadrature of each modulator are the same bits. With respect to PolMux QPSK (depicted in FIG. 2(b)), inphase and quadrature of each modulator are independent bits. With respect the PolSw QPSK format (depicted in FIG. 2(c)), both the inputs to IQ-Mod1 and the inphase of IQ-Mod2 are independent user bits, while the quadrature of IQ-Mod2 is the output of XOR operation among these three data. Finally, with respect to the PolAl QPSK format (depicted in FIG. 2(d)), the inphase and quadrature of IQ-Mod1 are independent bits while the outputs of the XOR operation are input to the IQ-Mod2 as the inphase and quadrature.

Consequently, the bit rates of these modulation formats may advantageously vary from 2 B to 3 B and 4 B corresponding to PolMux BPSK/PolAl QPSK, PolSw QPSK and PolMux QPSK respectively. As used herein, B represents the baud rate of the binary bits while the mode bit encoder (m) is 2, 3, and 4, accordingly.

As may now be further appreciated, in addition to the binary Bit Encoder Module (102) the Adaptive FEC Encoder Module (103) also allows flexibility in changing the bit rate and the error correction capability of the platform. By way of example, we begin by assuming that the FEC coding rate is R and the information bit rate (k) is equal to RB. As used in this example, the information bit rate represents client's data that is equal to 10 G/40 G/100 G. Since it is likely that the information bit rate is less than the required data rate ($R_b$), more channels are required to carry the client's data. This process is performed by the software-controlled manager module (104) to determine the adaptive FEC coding rate and the number of subcarriers ($N_{sc}$) produced by the multi-tone generation module (105).

Figure 3:
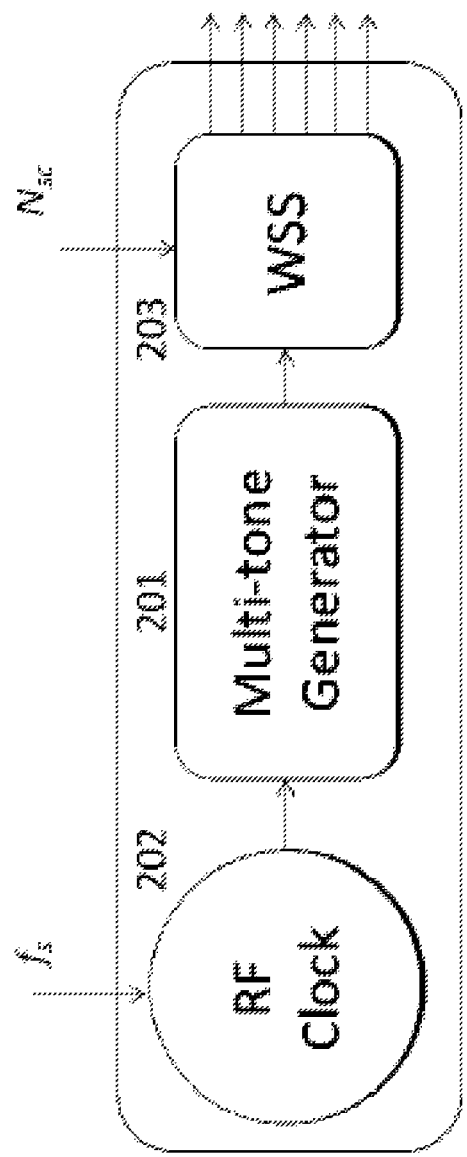
FIG. 3 shows a schematic of an exemplary implementation of a few-mode EDFA according to an aspect of the present disclosure.

With simultaneous reference to FIG. 3, there it is shown the multi-tone generation process as performed by the multi-tone generation module (105). As may be observed from that FIG. 3, the multi-tone generation module (105) comprises a RF clock (202), and a programmable wavelength-selective-switch (WSS) (203), and multi-tone generator (201). The RF clock rate ($f_s$) determines the spacing between optical subcarriers.

The WSS (203) is controlled by the Control Manager Module (104) to filter out subcarriers ($N_{sc}$) and demultiplex them into different output ports for modulation by modulators (106). The outputs of the modulators (106) are directed to the Combiner Module (107) where they are combined and then output to optical output fiber (not specifically shown). Consequently, the client's data rate is defined by $R_b = mBRN_{sc}$.

By way of specific example, we now consider how the platform components shown may be employed to transmit a user's 10 G/40 G/100 G data. Given that the binary baud rate B=2 Gbaud corresponding to a commercial DP-QPSK transponder. We can derive that $RN_{sc}$–25/16 when using PolMux BPSK modulation (m=2). When subjected to the constraint fo coding rate R<1, the FEC coding rate should be adjusted to be R=25/32 with two subcarriers $N_{sc}$=2, amounts to only 28% FEC overhead.

At this point those skilled in the art will appreciate that our architecture provides flexible bit rates through the effect of the multiple DP-QPSK transmitter modules (106). First, the binary bit encoder module (102) changes the modulation format and polarization multiplexing schemes such that different bit rate(s) and system performance is realized. Then, the adaptive FEC encoder (103) adjusts its coding rate. A software controlled manager module (104) coordinates the parameters of the bit encoder, FEC coding rate and the number of subcarriers generated by the multi-tone generation module (105). Accordingly, the systems and methods employing this architecture exhibit a flexibility to be used in any real-world system having a number of diverse requirements.

Those skilled in the art will readily appreciate that while the methods, techniques and structures according to the present disclosure have been described with respect to particular implementations and/or embodiments—including those further outlined in Appendix A, those skilled in the art will recognize that the disclosure is not so limited. Accordingly, the scope of the disclosure should only be limited by the claims appended hereto.

The invention claimed is:

1. A flexible-bit-rate optical DP-QPSK transmitter comprising:
    a client interface framing module for receiving an input data signal;
    a binary bit encoder module operable to generate different polarization multiplexed signals;
    an adaptive FEC encoder module;
    a multi-tone generation & DeMux module including an RF clock, a Multi-tone generator and a programmable wavelength selective switch;
    a number of modulators for modulating the FEC encoded signals onto the number of subcarriers produced by the multi-tone generation and demux modulator module;
    a combiner for combining the modulated signals into an output signal; and
    a control manager module operable to determine and set bit encoding parameters, the number of subcarriers produced by the multi-tone generation & demux module and FEC coding rate such that the output signal is one selected from standard 10 G, 40 G, and 100 G data.

2. The transmitter of claim 1 operable to provide a variable bit rate through the effect of different polarization multiplexing and modulation format(s).

3. The transmitter of claim 2 wherein the output multiplexed signals are one selected from the group consisting of PolMux, BPSK, PolMux QPSK, PolSw QPSK and PolAl QPSK wherein the one selected is so selected by the control manager module.

4. The transmitter of claim 3 wherein for PolMux BPSK output format the inphase and quadrature of each modulator are the same bits.

5. The transmitter of claim 3 wherein for PolMux QPSK the inphase and quadrature of each modulator are independent bits.

6. The transmitter of claim 3 wherein for PolSw QPSK both inputs to an IQ-Mod1 and an IQ-Mod2 are independent user data bits, while the quadrature of IQ-Mod2 is the output of an XOR operation among these three data.

7. The transmitter of claim 3 wherein for PolAl QPSK the inphase and quadrature of an IQ-Mod1 are independent bits while the outputs of an XOR operation are provided to an IQ-Mod2 as the inphase and quadrature.

* * * * *